US011738696B2

(12) United States Patent
Kirchhoff et al.

(10) Patent No.: US 11,738,696 B2
(45) Date of Patent: Aug. 29, 2023

(54) DEVICE FOR SENSING THE VEHICLE SURROUNDINGS OF A VEHICLE

(71) Applicant: ZF Friedrichshafen AG, Friedrichshafen (DE)

(72) Inventors: Johannes Kirchhoff, Colnrade (DE); Alex Hessel, Lemförde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/280,724

(22) PCT Filed: Sep. 25, 2019

(86) PCT No.: PCT/EP2019/075805
§ 371 (c)(1),
(2) Date: Mar. 26, 2021

(87) PCT Pub. No.: WO2020/064798
PCT Pub. Date: Apr. 2, 2020

(65) Prior Publication Data
US 2022/0009424 A1 Jan. 13, 2022

(30) Foreign Application Priority Data
Sep. 26, 2018 (DE) .......................... 102018216461.4

(51) Int. Cl.
*B60R 11/04* (2006.01)
*B60R 1/00* (2022.01)
(Continued)

(52) U.S. Cl.
CPC ................ *B60R 11/04* (2013.01); *B60R 1/00* (2013.01); *H01Q 1/3233* (2013.01);
(Continued)

(58) Field of Classification Search
USPC .......................................................... 348/148
See application file for complete search history.

(56) References Cited

U.S. PATENT DOCUMENTS 5,169,262 A * 12/1992 Wilson .................. E01C 23/163
404/94
10,074,894 B1 * 9/2018 Birnbaum .............. H01Q 11/04
(Continued)

FOREIGN PATENT DOCUMENTS

| CN | 103568954 A | 2/2014 |
| DE | 29922326 U1 | 4/2001 |

(Continued)

OTHER PUBLICATIONS

International Search Report and Written Opinion of the International Search Authority dated Nov. 26, 2019 in International Application No. PCT/EP2019/075805 (English and German languages) (13 pp.).

(Continued)

*Primary Examiner* — Behrooz M Senfi
(74) *Attorney, Agent, or Firm* — Crowell & Moring LLP

(57) ABSTRACT

A device may be included for sensing the vehicle surroundings of a vehicle. When mounted, the device has an underside facing the carriageway and an upper side facing away from the carriageway. The device comprises a fixture and a swivel arm that is movable relative to the fixture and connected thereto. The fixture has a fastening portion for fastening the device to a body part of the vehicle. The swivel arm comprises a camera for a lane-keeping function and an antenna.

9 Claims, 3 Drawing Sheets

(51) Int. Cl.
*H01Q 1/32* (2006.01)
*B60R 11/00* (2006.01)
(52) U.S. Cl.
CPC .................. *B60R 2011/004* (2013.01); *B60R 2011/008* (2013.01); *B60R 2300/8046* (2013.01)

(56) References Cited

U.S. PATENT DOCUMENTS

| 2003/0026009 | A1* | 2/2003 | Vandenbrink | B60R 1/078 359/877 |
|---|---|---|---|---|
| 2004/0171281 | A1 | 9/2004 | Matsuura | |
| 2017/0057423 | A1* | 3/2017 | Wang | H04N 5/2251 |
| 2017/0166130 | A1* | 6/2017 | Foote | H04N 5/23293 |
| 2018/0022278 | A1 | 1/2018 | Parat | |
| 2018/0337703 | A1* | 11/2018 | Price | H01Q 11/04 |
| 2019/0049574 | A1* | 2/2019 | Simula | B60R 1/00 |
| 2019/0124238 | A1* | 4/2019 | Byrne | H05K 7/20409 |

FOREIGN PATENT DOCUMENTS

| DE | 102010029465 A1 * | 12/2011 | ............. H04L 67/12 |
|---|---|---|---|
| DE | 102018119663 A1 * | 2/2019 | ......... G06K 9/00791 |
| EP | 2 774 815 A1 | 9/2014 | |
| WO | WO-9001853 A1 * | 2/1990 | ............... H04N 5/78 |
| WO | WO 2006/038274 A1 | 4/2006 | |
| WO | WO 2018/146094 A1 | 8/2018 | |

OTHER PUBLICATIONS

Office Action and Search Report in Corresponding Chinese Application No. 201980063167.3, dated May 26, 2023 (English Translation) (8 pages).

* cited by examiner

DEVICE FOR SENSING THE VEHICLE SURROUNDINGS OF A VEHICLE

RELATED APPLICATION

This application is a filing under 35 U.S.C. § 371 of International Patent Application PCT/EP2019/075805, filed Sep. 25, 2019, and claiming priority to German Patent Application 10 2018 216 461.4, filed Sep. 26, 2018. All applications listed in this paragraph are hereby incorporated by reference in their entireties.

TECHNICAL FIELD

The present application relates to a device for detecting a vehicle's environment and a vehicle that has two such devices on opposite sides of a vehicle body.

BACKGROUND

A vehicle driver can be assisted by various aids in monitoring road traffic. One of the proven aids are mirrors in the interior and on the sides of the vehicle for monitoring the vehicle environment. It is possible to replace the mirrors with cameras, which, used in combination with a screen, provide the driver with images of the observed environment. The cameras can record a field of vision that substantially corresponds to the field of vision provided by approved vehicle mirrors.

US 2017/0057423 A1 discloses a camera system used in a motor vehicle.

A system for improving vehicle environment detection comprising a camera configured to record an image of a selected portion of the vehicle's environment is known from US 2018/0022278 A1.

Based on this, the present disclosure teaches an improved device for detecting a vehicle's environment, and an improved vehicle.

BRIEF DESCRIPTION OF THE DRAWINGS

Certain embodiments shall be explained in greater detail in reference to the attached drawings. Therein.

DETAILED DESCRIPTION

Figure 1:
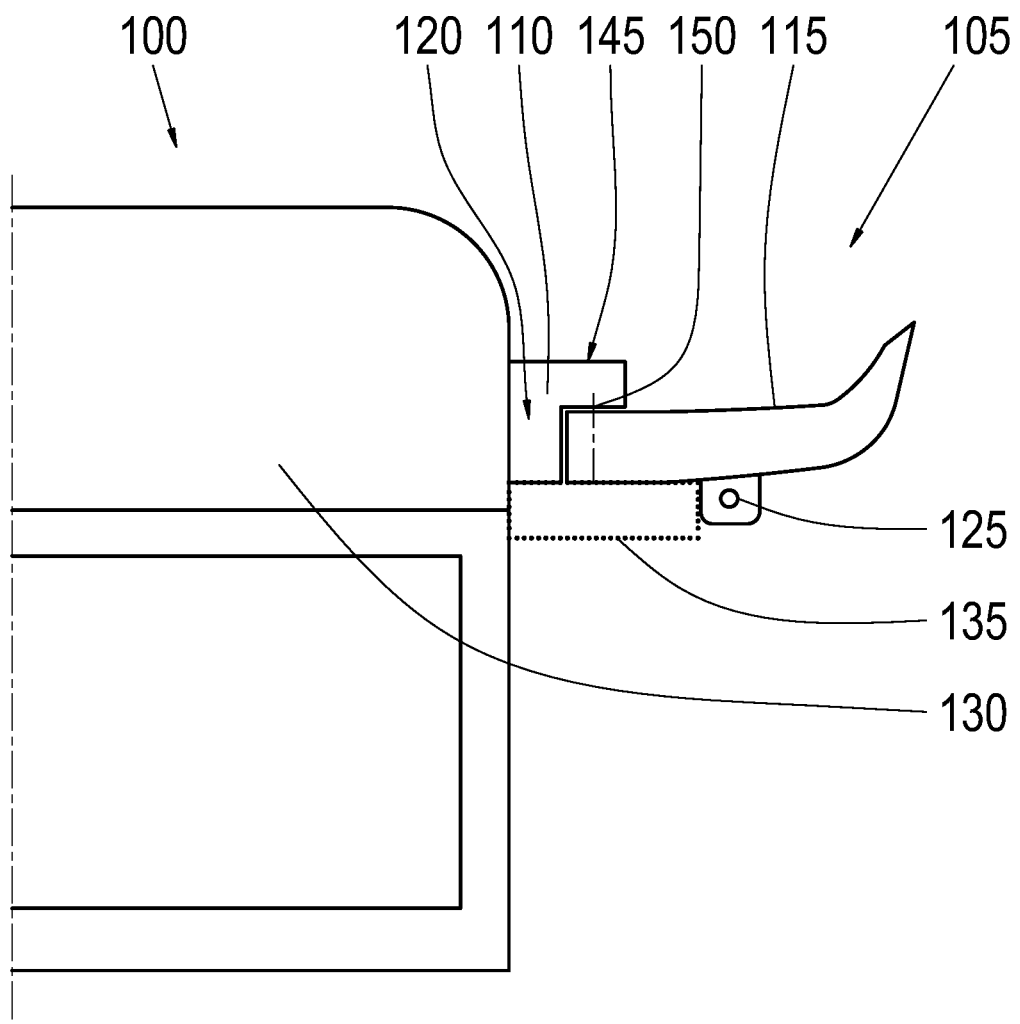
FIG. 1 shows a schematic illustration of a vehicle that has a device for detecting a vehicle's environment according to an exemplary embodiment.

In one aspect, a mirror on a vehicle can be replaced by a device that can contain a camera for a lane keeping function and an antenna for exchanging vehicle parameters. The device can have a moving part that can contain the camera and the antenna. This approach results in a space-saving installation on a vehicle.

A device for detecting a vehicle's environment is proposed. In the installed state, the device has a lower surface facing the road, and an upper surface facing away from the road surface. The device comprises a mount and a boom attached to the mount that can move in relation thereto. The mount has an attachment point for attaching the device to a part of a vehicle body. The boom comprises a camera for a lane keeping function and an antenna.

The vehicle can be a motor vehicle, e.g. an automobile, bus, utility vehicle, or a vehicle for transporting goods or people. The vehicle can be a partially or fully autonomous vehicle. The device can be used for a camera-monitor system in the vehicle, or for an electronic outer mirror. In addition, the device can be referred to as an electronic mirror module, "eMirrorModule," or an electronic outer mirror. The vehicle environment can be detected with the device, and monitored with the camera. The mount can contain one or more lines from the at least one camera to an interface for a control unit and a power source in the vehicle. The device can be rigidly connected to the body part via the attachment point, e.g. in a material-bonded or force-fitting manner, e.g. on a section of a lateral frame of the body. The boom, which can move in relation to the mount, can be attached to the mount such that it can pivot, fold or bend in relation thereto. The boom can also be in the form of a blade. The camera that can be accommodated in the boom can be designed to record a traffic lane, in order to assist the lane keeping function for the vehicle. The antenna accommodated in the boom can be a Wi-Fi antenna or a GPS antenna.

According to one embodiment, at least one second camera can be accommodated in the mount. By way of example, two cameras can be accommodated. The at least one second camera can be configured to detect a field of vision of one or more main rear view mirrors and a wide angle outer rear view mirror. Additionally or alternatively, the at least one second camera can be configured to record the field of vision of an oncoming vehicle outer mirror. Advantageously, the device can therefore contain numerous cameras for detecting the vehicle's environment and assisting a vehicle driver in monitoring the vehicle's environment. Furthermore, the at least one second camera can be accommodated in the mount in a space-saving manner.

According to one embodiment, the boom can be designed to carry lines for the camera and antenna toward the mount, wherein the mount contains a printed circuit board with connecting ports for the lines. The placement of the printed circuit board in the mount is advantageous with regard to keeping the lengths of the cables for the components in the boom and mount, e.g. the camera and the antenna, short, resulting in a stable signal transfer. Placing the printed circuit board in the mount also advantageously makes it possible to avoid bending of the lines in their pathways from the mount to a control unit in the vehicle.

The camera for the lane keeping function can be placed on the lower surface of the device, on the boom, according to one embodiment.

The camera can have a field of vision directed toward the front in the direction of travel. Consequently, the camera can be exposed directly to the wind generated by the movement of the vehicle.

Furthermore, the mount according to one embodiment can have a projection. The boom can be attached to the projection. This projection can partially cover the boom. The mount can be L-shaped, for example. The boom can be attached to an upper surface of the projection in the installed state. This advantageously results in a compact construction.

The mount and boom can also form a planar surface on the lower surface of the device according to one embodiment. For this, the boom can adjoin the lower surface of the mount, for example. This is advantageous when the camera for the lane keeping function is located on the lower surface of the boom according to one embodiment.

In order to move in relation to the mount, the boom according to one embodiment can be designed such that it can be folded in and out. The boom can be attached at one end to the mount for this, such that it can be folded away from the mount and back against it, e.g. via a pivoting or folding mechanism. The boom can be configured, for example, to fold out when the device is in operation, and fold back in when the device is in a standby mode. The folding in and out of the boom can take place in response to an electric signal, or it can be caused by a mechanical force acting on the boom. Advantageously, it is therefore possible to fold the boom in, in order for the vehicle to be able to move in a tight space, and fold it back out to assist in detecting the vehicle's environment.

The boom can also have a horn-shaped extension on a side facing away from the mount according to one embodiment. The antenna can be located in the extension. A horn-shaped extension is advantageous in enabling the antenna to be oriented in a perpendicular direction in a space-saving manner. This advantageously increases the transmission and reception quality of the antenna.

A vehicle is also proposed in this approach. The vehicle contains at least two embodiments of the aforementioned device, on opposite sides of the vehicle body. The mounts for each device are connected at their attachment points to a part of the vehicle body. The at least two embodiments of the device can be identical. The at least two devices can be located on the vehicle in addition to or instead of side mirrors. The width of the device when the boom is folded out can correspond, or be similar, to the width of a commercially available side mirror when it is folded in.

In the following descriptions of preferred exemplary embodiments, the same or similar reference symbols are used for elements acting in similar ways depicted in the various figures, and the descriptions of these elements shall not be repeated.

FIG. 1 shows a schematic illustration of a vehicle 100 that has a device 105 for detecting a vehicle's 100 environment according to an exemplary embodiment. A front view of one half of the vehicle 100 is shown. The vehicle 100 has one of the at least two of the devices 105 located on opposite sides of the vehicle 100 body, on the shown half. The two devices 105 can be identical, or two different embodiments of the vehicle 105, described below, can be placed on the vehicle 100.

In the installed state, the device 105 has a lower surface facing the road, and an upper surface facing away from the road surface. The device 105 comprises a mount 110 and a boom 115 that can move in relation to the mount 110 and is connected thereto. The mount 110 has an attachment point for attaching the device 105 to a part of the vehicle body. The boom 115 comprises a camera 125 for a lane keeping function, and an antenna.

In the installed state of the device 105 shown here, the mount 110 is connected to the part of the vehicle 100 body at the attachment point 120. The mount 110 is rigidly connected to the body part according to one exemplary embodiment, e.g. by means of a material-bonded connection. In this case, the mount 110 is connected to a section of a side frame of the vehicle body, near the cockpit 130 of the vehicle 100. The boom 115 is in the shape of a blade, by way of example.

The camera 125 is located on the lower surface of the device, on the boom 115 according to this exemplary embodiment. The camera 125 is at a certain distance to the body part connected to the mount 110, in this case, the body part of the cockpit 130. Additional sensors are advantageous in automating a vehicle, which observe the vehicle's environment. The device 105 shown here that has the camera 125 for the lane keeping function can also be used for this. The camera 125 must also have a certain spacing to the exterior as well, in order to be able to look past vehicles to the front. An area 135 between the cockpit 13o and the camera 125 therefore remains structurally unaffected, i.e. empty.

The mount 110 and the boom 115 according to this exemplary embodiment also form a planar surface at the transition between the mount 110 and the boom 115. For this, the boom 115 is flush to the lower surface lying opposite the boom 110. The planar surface is advantageous with regard to aerodynamics of a camera 125 located on the boom 115 in an airflow caused by the vehicle's travel.

The mount 110 according to this exemplary embodiment also has a projection 145. The boom 115 is attached to the projection 145, and is partially covered by the projection 145. The projection is at a right angle to the mount, and the boom 115 is attached to the mount 110 underneath the projection 145. The mount 110 has an L-shaped cross section.

To move the boom 115 in relation to the mount 110, the boom according to this exemplary embodiment is designed to be folded in and out. The boom is configured to move about a pivotal point 150. For this, the boom 115 is connected to the mount 110 by a pivoting or folding mechanism, and designed such that it projects outward from the mount 110 in the folded-out state. The boom 115 can also be bent in relation to the boom 110 to move it from the folded-out state shown in the present figure to a folded-in state. In the folded-in state, the distance between the free end of the boom 115 and an opposite body part on the vehicle 100 can be less than or equal to the length of the mount 110. This is enabled, e.g., via a pivoting mechanism between the mount 110 and the boom 115. The possibility of folding the boom 115 in or out is advantageous with regard to the maneuverability of the vehicle 100.

Figure 2:
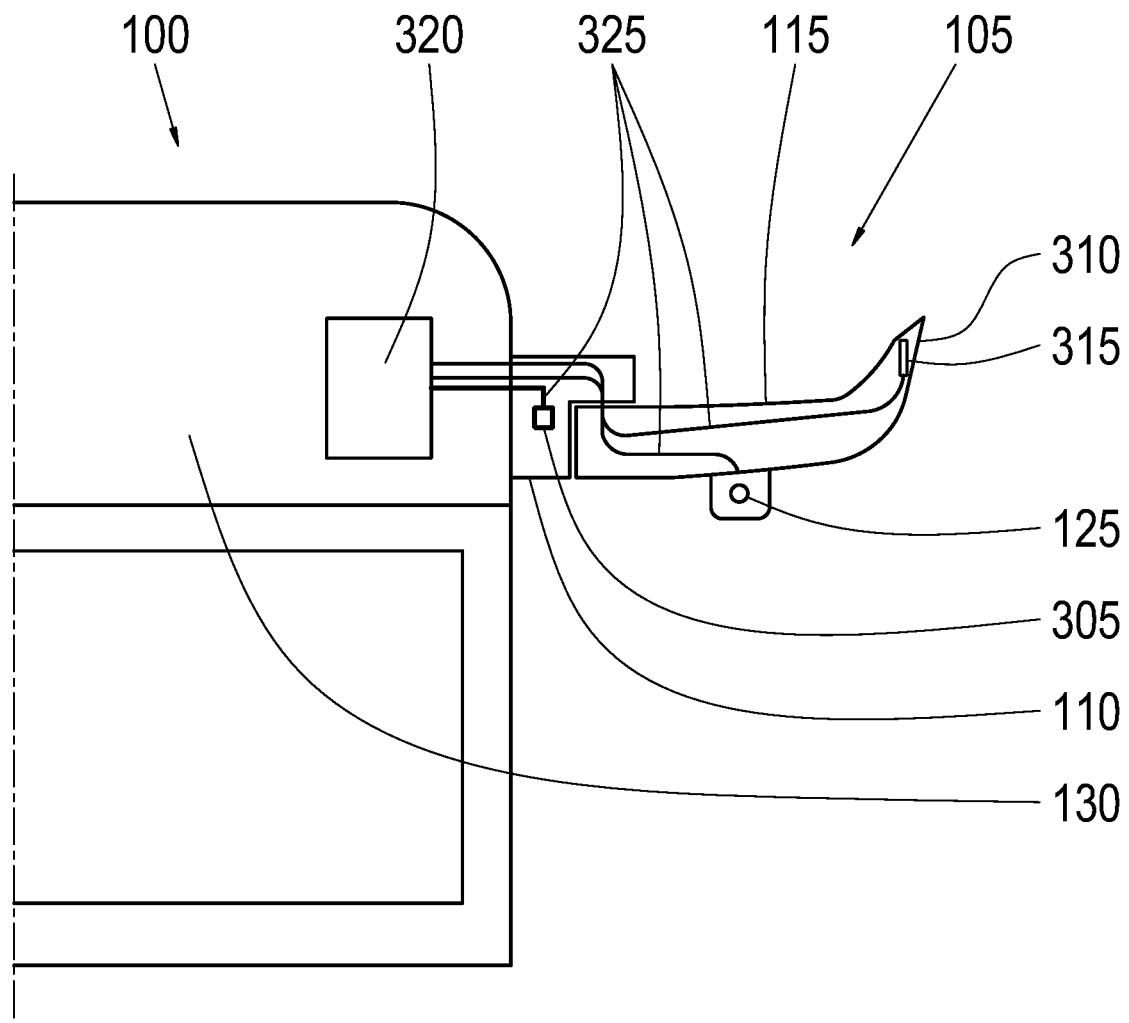
FIG. 2 shows a schematic illustration of a vehicle that has a device for detecting a vehicle's environment according to an exemplary embodiment.

FIG. 2 shows a schematic illustration of a vehicle 100 that has a device 105 for detecting a vehicle's 100 environment according to an exemplary embodiment. The vehicle 100 and device 105 shown here are similar or correspond to the elements described in reference to FIG. 1. According to this exemplary embodiment, at least one second camera 305 is contained in the mount 110. The at least one second camera 305 can be designed as a replacement for a mirror in or on the vehicle, as specified in guideline 2003/97/EG. For this, the second camera 305 is configured to record a field of vision of one or more main rear view mirrors and a wide angle outer rear view mirror. Additionally or alternatively, the second camera 305 can also be configured to record a field of vision of an oncoming traffic outer mirror. A viewing axis of the second camera 305 when the device 105 is installed is nearly perpendicular to a road surface in this case. More than the at least one second camera 305 can also be accommodated in the mount 110, e.g. two cameras 305, as described above. Placing the at least one second camera 305 in the mount is advantageous because there is a corresponding installation space for this. As a result, the height of the boom 115 is not increased by placing the at least one second camera 305 therein.

According to this exemplary embodiment, the boom 115 has a horn-shaped extension 310 on the side facing away from the mount 110. An antenna 315 is located in the extension 310. The antenna 315 can be a Wi-Fi antenna or a GPS antenna. The antenna 315 is configured, e.g. for vehicle-to-vehicle communication, also referred to as V2V communication, for exchanging vehicle parameters. As a result, if a forward vehicle brakes, a signal can be sent to the vehicle behind it, such that it can automatically react to the braking, and brake as well. This contributes to safety in road traffic. Placing the antenna 315 at a distance to metallic objects, e.g. the camera 125 for the lane keeping function, or the second camera 305, is advantageous with regard to a stable signal transfer and preventing electromagnetic interference.

A vehicle printed circuit board 320 is located in the cockpit 130 of the vehicle 100, for example. Cables 325 lead from the antennas 315, camera 125 and second camera 305 to the vehicle printed circuit board 320. The cables 325 are also referred to as lines 325 below. The device 105 shown here can also be referred to as a camera-based mirror with an integrated antenna 315 with a folding mechanism. Through the implementation of the pivoting or folding mechanism for the boom, torsional forces act on the cables 325 for the cameras 125, 305 and the antenna 315. This can result in strains being applied to the cables 325 at the transition between the mount 110 and the boom 115, because the cables 325 pass through a connection between the mount 110 and the boom 115. The connection intersects with the pivot point of the boom 115. The cables 325 bend twice in the path from the boom to the vehicle printed circuit board 320, in order to pass through the connection. An alternative cable path is shown in the following FIG. 4.

Figure 3:
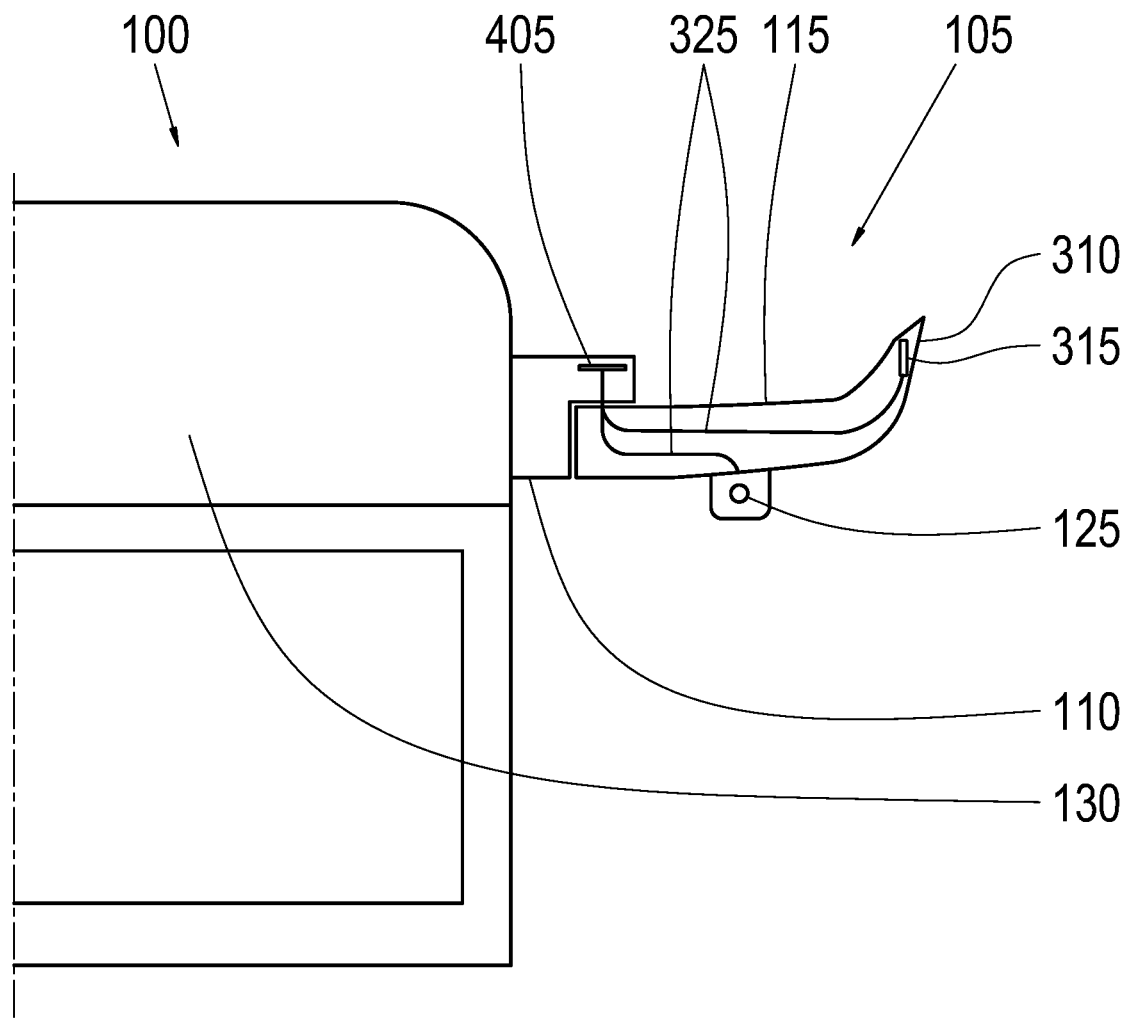
FIG. 3 shows a schematic illustration of a vehicle that has a device for detecting a vehicle's environment according to an exemplary embodiment.

FIG. 3 shows a schematic illustration of a vehicle 100 that has a device 105 for detecting a vehicle's 100 environment according to an exemplary embodiment. The components of the vehicle 100 and device 105 shown here are similar or correspond to the elements described in reference to the preceding figures.

According to the exemplary embodiment shown here, the boom 115 is designed to carry lines 325 for the camera 125 and the antenna 315 to the mount 110. The mount 110 has a printed circuit board 405 for this, with ports for the lines 325. The printed circuit board 405 can also be referred to as a connection printed circuit board. By placing the printed circuit board 405 in the mount 110, it is possible to prevent bending the cables 325 as they pass from the mount into the cockpit in the vehicle, in that the cables 325 are conducted to the printed circuit board 405 in the mount 110. This also shortens the lines 325, making the signal transfer from the camera 125 and antenna more stable. By positioning the connection printed circuit board 405 outside the vehicle 100 in the mount 110, it is also possible to integrate an antenna in the printed circuit board 405.

The printed circuit board 405 according to one exemplary embodiment has a connecting port that enables mechanical and electrical contact of the lines 325 to the printed circuit board 405 that can be disconnected. According to one exemplary embodiment, the printed circuit board 405 has a second connecting port for mechanical and electrical contact to at least one further line, via which the printed circuit board 405 can be connected to a line network or a control unit in the vehicle 100. The printed circuit board 405 can also have an electronics system for pre-processing data received via at least one of the lines 325 and/or controlling the camera 125 and/or the antenna 315.

REFERENCE SYMBOLS 100 vehicle
105 device for monitoring a vehicle's environment
110 device mount
115 device boom
120 attachment point for the device
125 camera for a lane keeping function
130 vehicle cockpit
135 area between the cockpit and the camera
145 projection on the mount
150 pivotal point
240 recess
305 second camera
310 extension on the boom
315 antenna
320 vehicle printed circuit board
325 cables
405 mount printed circuit board

The invention claimed is:

1. A device for detecting a vehicle's environment, the device comprising:
    a lower surface configured to face a road surface,
    an upper surface configured to face away from the road surface,
    a mount; and
    a boom connected to the mount,
    wherein the boom is movable relative to the mount via a pivot point,
    wherein the mount has an attachment point for attaching the device to a part of a body of the vehicle, and
    wherein the boom comprises at least one camera for a lane keeping function and wherein the boom comprises an antenna, each of the camera and the antenna being moveable relative to the vehicle when the boom pivots, and
    wherein the boom is designed to carry lines form the camera and antenna to the mount, wherein the mount contains a printed circuit board that has connecting ports for the lines.

2. The device according to claim 1, wherein at least one second camera is located in the mount.

3. The device according to claim 1, wherein the at least one camera is located adjacent to the lower surface of the device on the boom.

4. The device according to claim 1, wherein the mount has a projection, wherein the boom is attached to the projection, and wherein the projection partially covers the boom.

5. The device according to claim 1, wherein the mount and the boom form a planar surface on the lower surface of the device.

6. The device according to claim 1, wherein the boom is configured such that it can be folded in and out in relation to the mount.

7. The device according to claim 1, wherein the boom has a horn-shaped extension on a side facing away from the mount, and wherein the antenna is located in the extension such that at least a portion of the antenna is located vertically above a horizontal portion of the boom.

8. A vehicle comprising the device of claim 1, wherein the mount for the device is connected to a part of the vehicle's body at the attachment point.

9. The vehicle of claim 1, wherein the lines extend from the boom to the mount at the pivot point.

* * * * *